United States Patent

[11] 3,593,410

| [72] | Inventor | Robert A. Taylor |
| | | 6599 Osage St., Allen Park, Mich. 48101 |
| [21] | Appl. No. | 684,763 |
| [22] | Filed | Nov. 21, 1967 |
| [45] | Patented | July 20, 1971 |

[54] METHOD FOR CASTING AND FINISHING TOOLS OR DIES
7 Claims, 21 Drawing Figs.

[52] U.S. Cl. ................................................. 29/557,
51/317, 164/34, 164/361
[51] Int. Cl. ................................................. B23p 13/04
[50] Field of Search ........................................... 29/529;
164/34, 41, 361; 76/90, 107; 51/317, 318, 325, 25

[56] References Cited
UNITED STATES PATENTS

| 2,899,777 | 8/1959 | Davidson | 51/317 X |
| 3,290,836 | 12/1966 | Ruppe | 51/317 |
| 3,343,430 | 9/1967 | Haas et al. | 76/107 |
| 3,436,874 | 4/1969 | Betzler | 51/325 |
| 1,560,033 | 11/1925 | Bart | 29/557 |
| 2,298,418 | 10/1942 | Roesner et al. | 29/557 |
| 2,577,818 | 12/1951 | Shaw | 29/557 |

Primary Examiner—John F. Campbell
Assistant Examiner—Robert J. Craig
Attorney—Whittemore, Hulbert & Belknap ABSTRACT: Male and female members are matched and fitted together in order to remove any protuberances. The die members are mounted in a vibrating machine where the matching surface of one die member is chemically treated with an active solution such as copper sulfate to chemically alter the matching surface to a predetermined depth. Abrasive grains or grits are also interposed in the solution between the matching surfaces of the die members. The relative movement between the die members caused by the vibration of the machine results in the abrasive grains scratching the chemically altered surface at the points or areas of contact. Thus by mechanically abrading and chemically altering such areas an extremely high-quality level of tool and die spotting or matching is obtained.

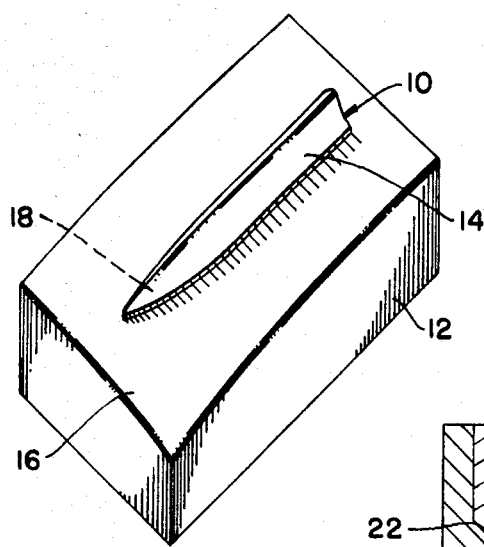
FIG.1
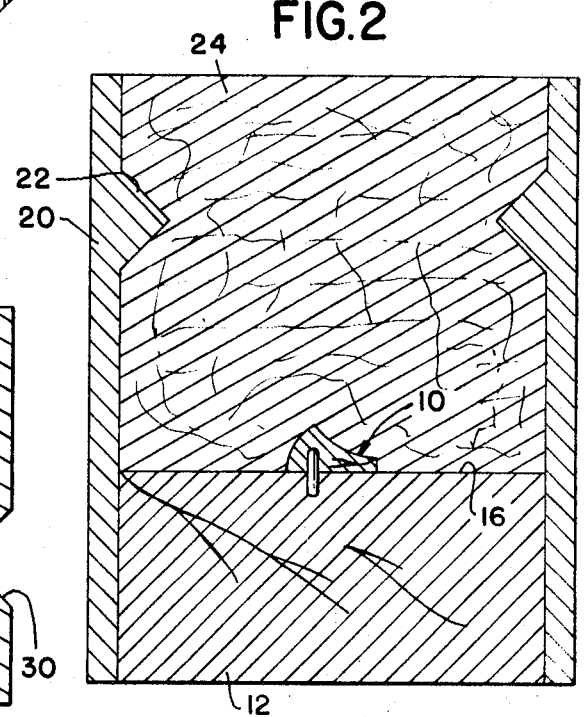
FIG.2
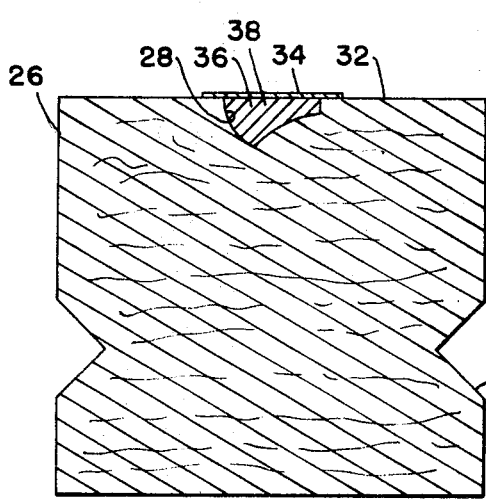
FIG.3
FIG.4
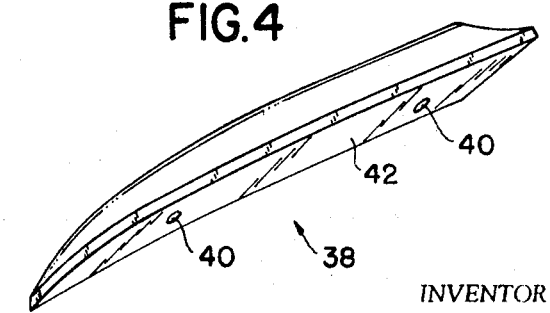
FIG.5
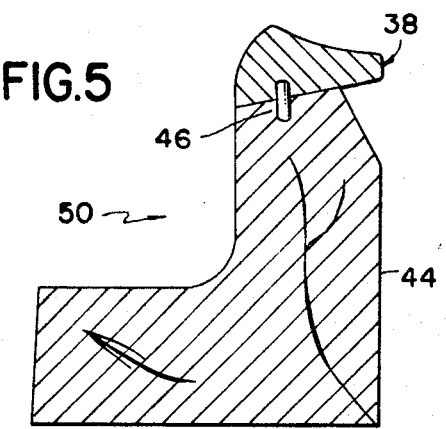
INVENTOR
ROBERT A. TAYLOR
BY Whittemore, Hulbert & Belknap
ATTORNEYS

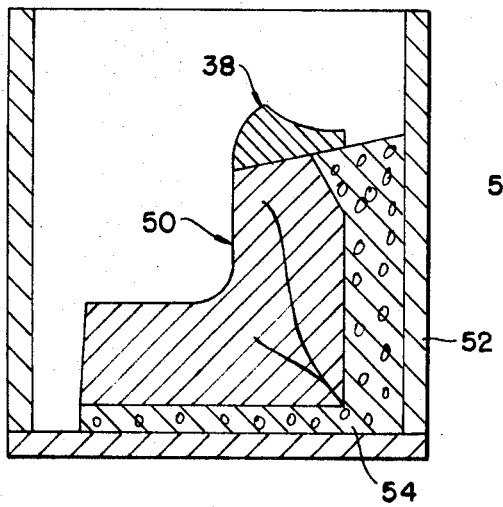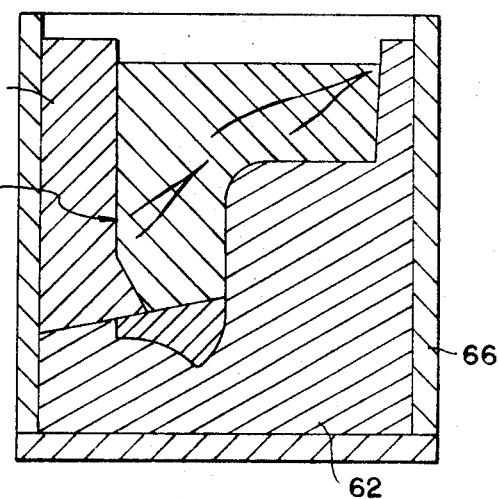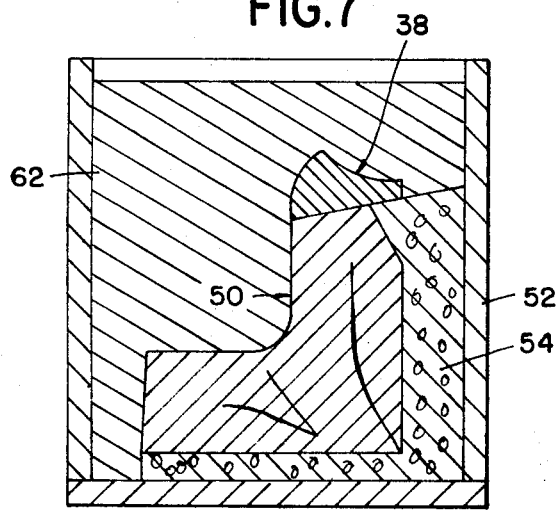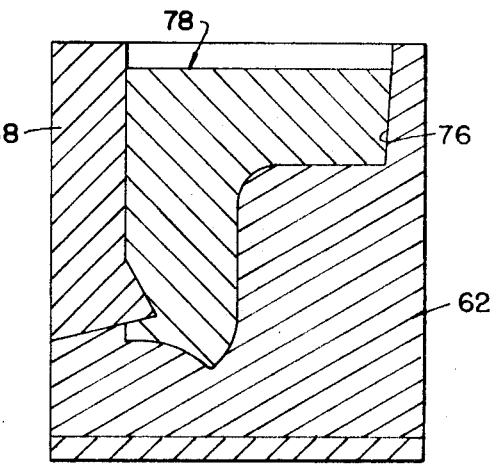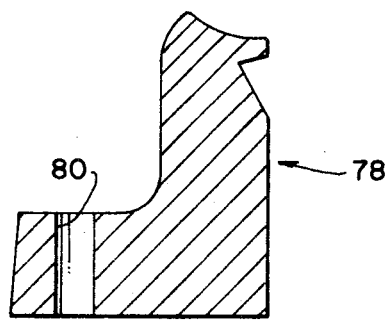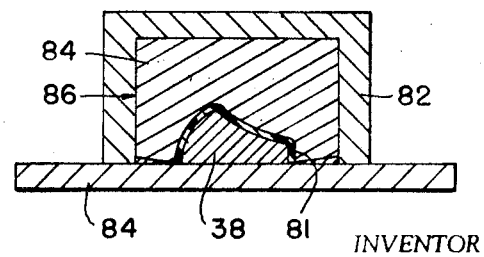

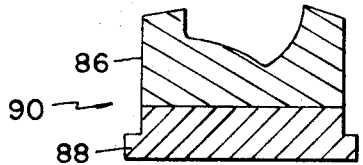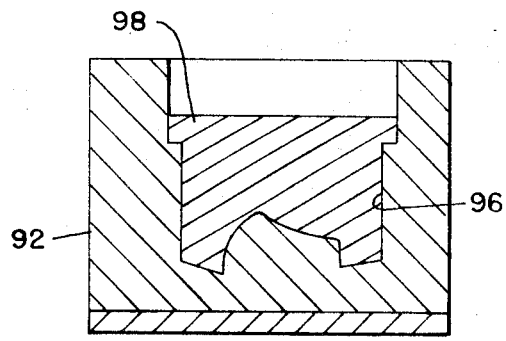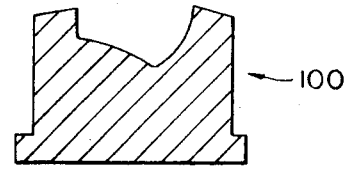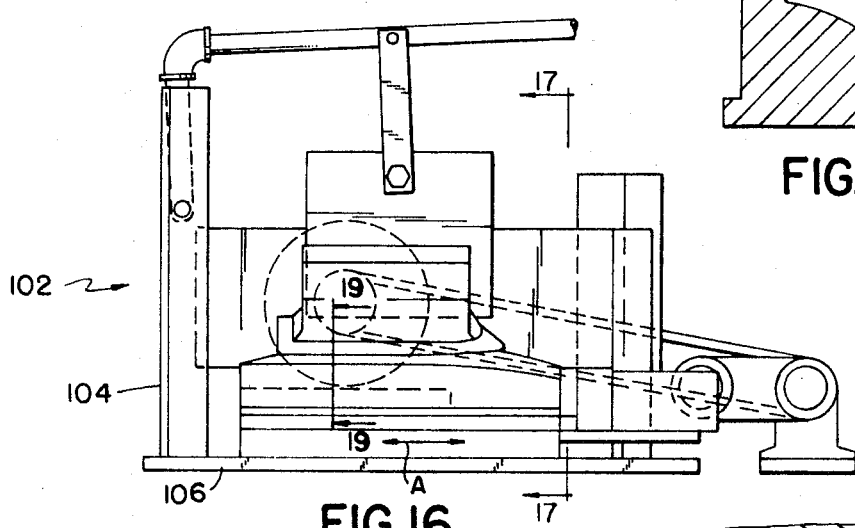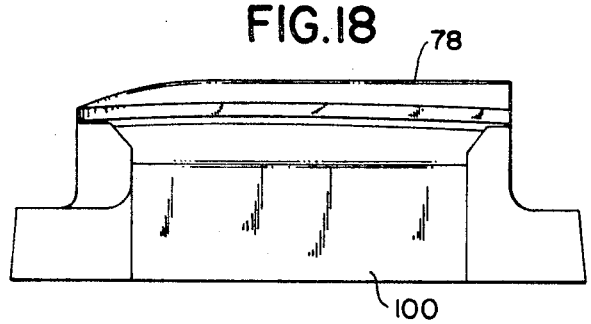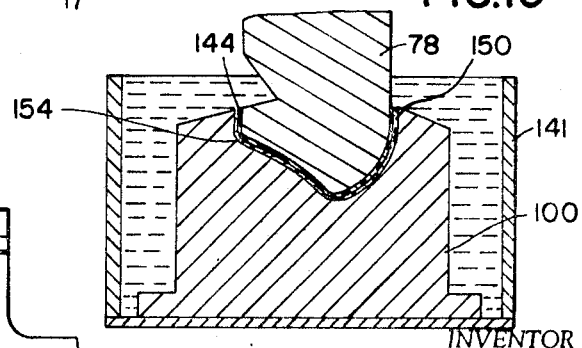

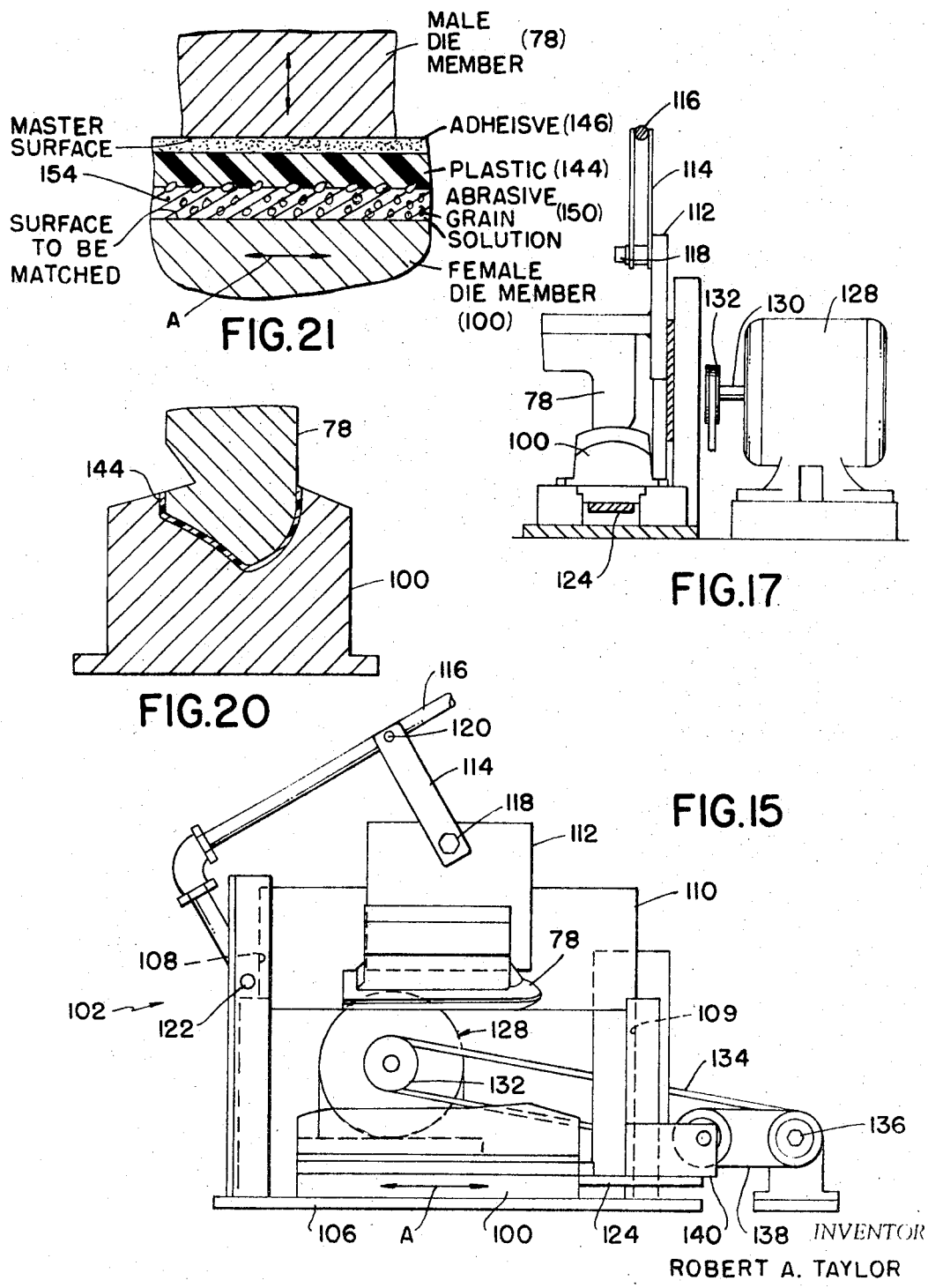

3,593,410

METHOD FOR CASTING AND FINISHING TOOLS OR DIES

THE METHOD OF PRODUCING DIES BY PRESENT TECHNOLOGY

Dies made according to present technology require that a wood die model be manufactured, the outer surface of which represents the inside metal surface of the finished stamping. The die model represents the master surface which is to be duplicated in steel. The number of times that the die model is duplicated depends upon the number of dies required by the process engineer and could vary from five to nine depending upon the volume of production, the type of material to be used, and other factors.

In order to make a steel punch or die to return a flange on one side of the stamping by conventional methods includes the following steps: (1) cast or form a hard plastic female member from the die model which is to be used for spotting (finishing by hand) the top surface of the punch; (2) project a plan view templet of the die model upon a flat piece of sheet metal which is then cut and filed as accurately as possible; (3) perform the following operations on a rectangular piece of steel;

a. Machine off the raw stock in order to lay out and machine the punch properly.

b. Using the templet aforesaid, lay out the plan of the punch, and then shape and mill the templet as skillfully as possible. At no time can the templet be undercut since it would, of course, ruin the workpiece. After the machining has been completed the raw stock must be hand finished to match the contour of the templet. It is very important at this point to avoid any undersize or oversize condition.

c. Erect on a counter duplicator such as a Keller or Hydro-Tel the wood die model and the contoured punch formed from the raw stock. It is then necessary to machine the top surface of the punch. During such operation great care and skill must be used to avoid any undercutting. Upon completion of the machining operation the punch is returned to the tool maker who removes all the tool marks from the punch and also spots or fits the punch to the corresponding plastic female die member aforesaid.

d. With the top surface of the punch completed, it is now possible to lay out the return flange line. This requires that the punch be taken to a milling machine and skillfully cut as close as possible after which time it is returned to the bench hand for final finishing.

Thus, the number of individual operations required to process one die or punch, constructed to return a flange on one side of the stamping, includes many individual operations including the following: cut off the raw stock from the steel bar by the use of a steel saw; square up the raw stack for layout on a shaper; project, saw out and hand file the templet; cast spotting rack (female); layout contour; shape and mill contour (plan view); hand finish contour; set up and duplicate top surface of the punch on a contour duplicator; hand finish top surface by using spotting rack; lay out return flange line; set up and machine; and hand finish return flange line.

It will be appreciated that all of these operations require expensive machines plus competent and highly skilled tool makers and workmen to perform the various machine and hand operations.

SUMMARY OF THE INVENTION

The invention relates to methods and techniques for casting and finishing tools and dies with precision accuracy without utilizing expensive machines and highly skilled tool makers as now required in the industry. New skills and techniques are disclosed which can be taught to young apprentices desiring to become tool and die makers, without requiring the apprentices to learn conventional methods for making tools and dies. Apprentices can be taught the skills and techniques of the present invention more rapidly and at less cost than would be required for conventional methods.

The present invention utilizes a metal expansion model which permits and guarantees that all of the required male and female die members will be identical in shape or contour. In addition the amount of shrinkage of the molten metal used in casting each die is compensated for in the manufacture of the metal expansion model so that when the die is cast in the foundry it will be of the exact size as the original wood die model. Once the metal expansion model is manufactured, the wood die model is no longer required for manufacturing the other dies as is required in conventional methods.

Once the male and female die members have been completed a unique method of matching or spotting same is disclosed. Such method includes combining the steps of chemically altering the surface area of the dies and mechanically abrading same in order to remove any protuberances on either member. The resulting die members provide an extremely high-quality level of tool and die spotting or matching.

The foregoing, as well as other objects, will become more apparent as this description proceeds, especially when considered in connection with the accompanying drawings illustrating the invention, wherein:

FIG. 1 is a perspective view of a die model and corresponding base both of which are made from wood.

FIG. 2 is a vertical sectional view through a prefoundry mold containing the wood die model in the bottom or lower portion, with the upper portion of the mold containing an expanding gypsum cement which, when hardened, forms the female expansion cement model as illustrated in FIG. 3.

FIG. 3 is a transverse sectional view through the female expansion cement model, with the cavity therein containing a metal alloy which, when hardened, forms the metal expansion model illustrated in FIG. 4.

FIG. 4 is a perspective view of the metal expansion model.

FIG. 5 is a vertical sectional view through the composite male pattern comprising the metal expansion model mounted on a foot made from wood or plaster.

FIG. 6 is a vertical sectional view through the foundry mold containing the composite male pattern illustrated in FIG. 5.

FIG. 7 is a vertical sectional view through the foundry mold and illustrating the manner of making one-half or part of the casting mold according to the Shaw Process.

FIG. 8 is a vertical sectional view through the foundry mold and further illustrating the manner of making the second part or half of the casting mold according to the Shaw Process.

FIG. 9 is a vertical sectional view through the two assembled parts of the casting mold made in FIGS. 7 and 8 and further illustrating the cavity as containing a metal alloy which, when hardened, forms the metal punch illustrated in FIG. 10.

FIG. 10 is a vertical sectional view through the metal punch and illustrating one of the mounting holes provided therein.

FIG. 11 is a transverse sectional view through a prefoundry mold containing the metal expansion model provided with a plastic covering or coating thereon in the lower portion of the mold, with the upper portion of the mold containing a bismuth alloy which, when hardened, forms the female metal expansion model.

FIG. 12 is a vertical sectional view through the composite female pattern comprising the female expansion model mounted on a foot made from wood or plaster.

FIG. 13 is a vertical sectional view through the female casting mold, somewhat similar to FIG. 9, made according to the Shaw Process and defining a cavity containing a metal alloy, which, when hardened, forms the metal die illustrated in FIG. 4.

FIG. 14 is a vertical sectional view of the metal female die.

FIG. 15 is a front elevational view of the vibrating apparatus in a nonoperating position.

FIG. 16 is a front elevational view of the vibrating apparatus or mechanism in an operating position, with the male and female dies attached and in matching position, and with said dies being adapted to be inserted in a container (containing a chemical solution), not shown, for clarity purposes.

FIG. 17 is a view of the vibrating apparatus, partly in section, taken on the line 17—17 of FIG. 16.

FIG. 18 is a front elevational view of the male and female die members in a matching position.

FIG. 19 is an enlarged sectional view (somewhat exaggerated) taken substantially on the line 19—19 of FIG. 16, with the matching die members immersed in a chemical solution located in a container mounted on the vibrating apparatus.

FIG. 20 is a sectional view through the male and female die members, illustrating a cover made from plastic or other suitable material firmly attached to the male die member prior to mounting same in the vibrating machine.

FIG. 21 is a schematic and fragmentary front view of the male and female die members, illustrating the operations employed to match the die surfaces.

It is well known in the art in order to make a single metal stamping, as an example, a metal stamping for a modern automobile that it requires from five to nine different punch and die members, each of which must be as identical in surface contour to the other members as is humanly possible. The degree to which the corresponding punch and die members match each other determines the quality of the finished part or stamping and it also determines the productivity and life of the punch and die members.

In order to make a steel punch or a steel die according to conventional methods requires many different hand and machine operations. All of these operations require expensive machines plus competent and highly skilled toolmakers to perform them.

The present invention eliminates the requirement of expensive machines and highly skilled toolmakers for making punch and die members. The present invention discloses new methods and techniques for casting the punch and die members with precision accuracy whereby all of the punch and die members required to make a metal stamping are identical in shape and surface contour.

FIG. 1 illustrates a three-dimensional die model 10 made, as an example, from wood. The wood die model 10 is removably connected by a plurality of pins, not shown, to a base 12 which is also made from wood. The die model 10 has an outside surface 14 which represents the inside surface of the metal stamping to be manufactured. The base 12 includes a surface 16 which is contoured in two directions and which represents the surface of the automobile upon which the metal stamping is to be mounted. The lower surface 18 of the die model 10 is curved or contoured and conforms to the contour of the base surface 16.

The die model 10 and base 12 may be made by conventional methods. As an example, the three-dimensional model 10 and base 12 may be hand carved utilizing conventional methods and skills or they may be made by computer-controlled machines as is also conventional in the art.

Heretofore in order to make the required five to nine die members, it was necessary to make a number of patterns directly from the three-dimensional wood die model 10. It required large and expensive machines and highly skilled toolmakers in order to make the identical dies. In order to manufacture and cast stamping dies to size (and thereby eliminate the machining and hand finishing operations of the prior art) required the solution of three difficult problems. The first problem is the production of foundry patterns that allows proper shrinkage of the metal from molten to solid states and which are capable of retaining their shape and surface. The second problem is to cast from five to nine different patterns or items that are identical only in the stamping surface area. The third problem is to remove minor defects from the matching die members that seem to be always present in matching corresponding die members together.

In order to overcome certain of the aforementioned problems the base 12 and wood model 10 are mounted in a prefoundry mold 20 as illustrated in FIG. 2. The mold 20 includes a pair of inwardly extending ridges or protuberances 22. The base 12 is located in the lower portion of the mold 20. A predetermined quantity of an expanding gypsum cement or plaster 24, in a liquid state, is poured into the mold 20 in order to occupy the upper portion thereof. The proper proportions of expanding gypsum cement and water are initially mixed together according to a predetermined formula or ratio. A predetermined volume of the liquid cementitious mixture is placed in the mold 20 which, when hardened, will expand exactly the amount that a steel casting will shrink as will subsequently appear. It has been found that expanding plasters or expanding gypsum cements manufactured by U.S. Gypsum Company under the trademarks HYDROCAL and Ultracal, work very satisfactorily in forming the female expansion plaster or cement model 26. The use of such expanding materials in the foundry industry is described in U.S. Gypsum's Bulletins No. IGL-115 U.S.G. Rev. 8/64 entitled "U.S.G. Process and Casting Materials" and in Bulletin No. IGL-116, U.S.G. Rev. 4/66 having the same title as the first identified bulletin.

The expanding gypsum cement selected is, of course, dependent upon the amount of expansion required in the expansion model 26. The expanding gypsum cement such as Hydrocal expands uniformly in all directions. The amount of expansion can be controlled by the quantity of water used in the mix. Through the proper water to plaster ratio, it is possible to achieve expansion values from one-sixteenth inch to five-sixteenths inch per foot.

After the expansion plaster model 26 has set or hardened, it is removed from the mold 20. The cavity 28 provided in the expansion model 26 is oversized or in other words it is larger than the wood model 10, the expanding cement 24 having expanded equally and uniformly in all directions. The expansion model 26 illustrated in FIG. 3 is provided with longitudinally extending hand grips 30 which permits the expansion model 26 to be lifted or carried conveniently. The upper surface 32 of the expansion model 26 surrounding the cavity 28 is curved and conforms to the contoured surface 16.

Thereafter the expansion model 26, with the cavity 28 facing upwardly as shown in FIG. 3, is provided with a metal or fiber plate 34 above the cavity 28 to form a closed mold 36. The plate 34 is provided with proper gates, not shown, leading into the closed mold 36. Thereafter a low temperature metal alloy is poured into the closed mold 36 through the gates therefor in order to fill same and to produce or form a metal expansion model 38. It has been found that an alloy consisting of 40 percent bismuth and 60 percent tin and sold under the trademark Cerrocast provides excellent results. Such alloy melts at approximately 300° F. and shrinks only one tenthousandth of an inch per inch (−0.0001) upon cooling. It should be appreciated that other types of bismuth alloys may be utilized such as the alloys shown in the four-page brochure entitled "Cerro Alloys /Quick Facts" published by Cerro Sales Corporation of New York, New York. The expansion model 38 is thus smaller than the cavity 28 and slightly larger than the wood die model 10. Thus the metal alloy, when hardened, forms the metal expansion model 38 which is a duplicate of the original wood model 10 and further contains the exact shrinkage needed to make a foundry pattern for a steel casting as will subsequently appear. Thereafter the metal expansion model 38 is hand rubbed to provide a high-luster finish thereon which will allow the toolmaker to visually detect surface defects which cannot be seen on wood or plaster. The formation and use of the metal expansion model 38 is very important to the techniques and methods disclosed herein.

It will be appreciated that most punches require flanges or feet to provide stability when in use and to also provide room for attaching screws and dowel pins. In addition, each of the flanges and feet perform different functions and thus are of different size and shape.

The present invention solves this problem by making a base, from wood or plaster, for each of the five to nine die operations. However, in order to guarantee the integrity of the metal part to be manufactured, the same expansion model 38 is attached to each individual base, in turn, as the foundry mold is poured for each individual die.

It is evident to those persons skilled in the art the difficulties that are inherent in attempting to produce an expansion pattern for each different die and that maintains part integrity at the same time. Previous attempts involving a multiple of different patterns, for the same part, have been failures, because of the human element being involved in each successive transfer from the original wood die model. The present invention eliminates such human error since the same expansion model 38 is used throughout the entire foundry operations.

Upon completion of the metal expansion model 38, a pair of holes 40 are drilled in the contoured base 42 thereof. In addition, the requisite number of flanges or feet are also manufactured by hand from wood or plaster. Thereafter the expansion model 38 is mounted on one of the flanges 44 by means of a plurality of pins 46 to form a composite male pattern 50 as illustrated in FIG. 5.

Upon completion of the composite male pattern 50, the toolmaker then utilizes the SHAW PROCESS to produce a casting mold into which is poured the molten steel. Such process is described in the book entitled "The Shaw Process" bearing the notation "Copyright 1962 Avnet-Shaw Corp., Div. Avnet Electronics Corp., Plainview, L.I., N.Y." The Shaw Process is also described in various U.S. Pats. including Nos. 2,795,022; 2,811,760; 2,911,310; 2,931,081; 2,935,772; 2,979,790; 3,022,555.

The term "Shaw Process" as described in the aforesaid U.S. Pat. No. 2,795,022 briefly comprises: preparing a slurry comprising comminuted refractory materials and a binder of liquid lower alkyl silicate, water and a gelling accelerator, pouring said slurry over a pattern, allowing the slurry to gel, separating the gelled mass of the slurry from the pattern, and thereafter igniting the surfaces of the gelled mass and allowing the flames resulting from said ignition to burn until the flammables are consumed thereby obtaining a mold of porous structure.

FIGS. 6—9 inclusive illustrate the Shaw Process and the various stages of preparing a mold form of two mating halves for use in casting the metal punch illustrated in FIG. 10.

A mold box 52 is partially filled with clay 54 into which is placed or set the composite male pattern 50 as shown in FIG. 6. A pin or key, not shown, may be utilized in the box 52. The mold box is then filled with a slurry as illustrated in FIG. 7 to form the mold part 62. The slurry, as an example, may be made of comminuted refractory, binder and gelling agent such as the slurry of the Shaw U.S. Pat. No. 2,795,022. When the slurry hardens or gels the surfaces thereof may be coated with a sealant according to the Shaw Process and described in U.S. Pat. No. 2,979,790.

Thereafter the mold part 62 is placed in the bottom of the mold box 66 of FIG. 8, with the composite pattern 50 set therein as illustrated. The mold box 66 is then filled with the slurry to form the second mold part 68 for the casting mold. When the slurry hardens or gels the surfaces of the mold part 68 may be coated with a sealant as described heretofore. The two parts 62 and 68 are then assembled as a foundry mold as illustrated in FIG. 9 to define the cavity 76.

Prior to moving the assembled mold parts 62 and 68 into the foundry, the metal expansion model 38 is mounted in turn on the remaining feet or flanges and the Shaw Process is repeated as described heretofore for each composite pattern. Once the required molds have been completed, each mold is poured full with molten steel.

As an example when the mold defined by parts 62 and 68 is poured with molten steel, time is required for the steel to cool to produce the punch 78 shown in FIG. 10. The steel shrinks during cooling whereby the resulting steel punch 78 has the exact surface contour as the wood die model 10. The amount of shrinkage of the molten steel is taken into account in determining the amount of expansion of the expansion cement model 26. It may thus be stated that the shrinkage of the metal expansion model 38 plus the shrinkage of the metal punch 78 less the expansion of the female expansion model 26 equals zero.

After the requisite number of punches (five to nine in number) have been manufactured, the flange or base of each punch is drilled to provide one or more mounting openings or holes 80.

Once the required number of male punches have been completed, it is then necessary to produce the mating or female parts of the die. Once again the metal expansion model 38, illustrated in FIG. 4, is used in forming a female expansion model.

The metal expansion model 38 is covered with a layer of vinyl plastic 81 or its equivalent as shown in FIG. 11. The vinyl plastic 81 represents the thickness of the metal or plastic to be stamped or formed. Initially, an adhesive is placed on the metal expansion model 38 and thereafter the plastic cover 81 is pressed against the adhesive to firmly secure same to the expansion model 38. The plastic-covered expansion model 38 is then places in a mold 82 adjacent the bottom wall 84 as best illustrated in FIG. 11. The mold 82 is of predetermined volume and is provided with proper gates, not shown. Thereafter, a metal alloy 84 is poured into the mold 82 and surrounds and encompasses the exposed portions of the plastic-coated expansion model 38. The metal alloy 84 consists of 49 percent bismuth, 18 percent lead, 12 percent tin and 21 percent indium. Such alloy melts at approximately 136° F. It is safe to pour the metal alloy 84 on the plastic cover 81 and the expansion die model 38 which comprises a low-temperature alloy as described heretofore.

The metal alloy 84, when set, forms the female expansion model 86. The alloy 84 also has an immediate expansion after it is poured into the mold. However, after 1 hour the female expansion model 86 shrinks to 0.0000 inch. This allows for removal of the male expansion model 38 from the mold 82 without damage to either the male expansion model 38 or the female expansion model 86. The female expansion model 86 represents the outside metal of the finished stamping.

The female expansion model 86 is utilized in manufacturing the female members of the dies. In certain instances the feet or flanges of the female dies may vary. Thus, it is necessary to make a wood or plastic foot 88 (FIG. 12) for each of the female parts. Thereafter the female expansion model 86 is secured to each foot 88 in turn or sequence to produce a composite pattern 90 as illustrated in FIG. 12.

From the composite pattern 90 is then produced or casted the corresponding female part 92 according to the Shaw Process as described heretofore in conjunction with FIGS. 6—8 inclusive. FIG. 13 illustrates the solidified ceramic part 92, made according to the Shaw Process, as having a mold cavity 96 into which is poured the molten steel 98. The molten steel 98, forming the female die member 100 (FIG. 14), shrinks. As is the case with the punch or male member 78, the shrinkage of the metal expansion model 38 plus the shrinkage of the female die member 100 minus the amount of the expansion of the female expansion model 26 equals zero. Thus the mating surface of the female die member 100 is slightly larger than the wood die model 10 in an amount equal to the thickness of the material to be stamped or formed as represented by the plastic cover 81.

The use of the male and female expansion models in conjunction with the Shaw Process have produced high integrity cast to size castings. With the process of the present invention it is possible to exactly duplicate the matching surfaces of the die parts or members. In addition, it has been found that the use of a metal expansion model provides a high-luster surface finish which provides a superior surface on the finished steel castings.

The methods and techniques disclosed herein have solved two of the three problems associated with the cast to size technique. The first problem solved was in the production of foundry patterns that allows proper shrinkage of the metal from molten to solid states and which are capable of retaining their shape and surface. The second problem solved was the ability to cast from five to nine different patterns or items that are identical only in the stamping surface area.

In order to remove minor defects from the matching die members, which is the third problem stated heretofore, there is employed a new and useful method of selective material removal, i.e., spotting or matching. In order for a tool or die to function properly the male and female members of the die must be accurately matched or fitted together. In the case of sheet-metal-stamping dies or plastic-sheet-forming dies, the die members must be fitted to opposite or opposing surfaces of the sheet. It is evident that any protuberances on either of the matching die members would interfere with the proper forming or stamping of the sheet material. The following method and technique will eliminate the costly, time-consuming and sometimes sloppy workmanship employed with the present methods of hand-file working, hand grinding and hand polishing the dies.

The method or process employed in matching the surfaces of the male member 78 and the female member 100 includes the steps of chemically altering and mechanically abrading the protuberances on the surface of the female die member 100.

FIGS. 15—17 inclusive illustrate a vibrating machine or apparatus 102 comprising a frame 104 and a base 106. The frame 104 is provided with a pair of vertically extending and transversely spaced guideways 108 and 109 at opposite sides of the frame in which is guidingly movable the vertical slide 110. The slide 110 is provided with a centrally located plate 112 which is pivotally connected on its upper edge by a strap or link 114 to a hand-operated lever 116. The link 114 is pivotally connected on one end to the plate 112 by a pivot pin 118 while the other end of the link 114 is connected to the lever 116 by a bolt 120. The lever 116 is of L-shaped configuration, with the end of the shortest leg thereof being pivotally attached to the frame 104 by the pivot pin or connection 122. Pivotal movement of the lever 116 about the pivot connection 122 is effective to move the slide 110 vertically upwardly or downwardly. The male punch 78, which serves as the master member, is adapted to be bolted to the plate 112 and raised and lowered upon movement thereof by the handle 116 as will subsequently appear.

The base 106 includes a transversely movable slide 124 (FIG. 17) upon which is fixedly mounted the female die member 100. Thus the slide 124 and die member 100 are adapted to be reciprocated in the directions indicated by arrow A in FIGS. 15 and 16 by means to be subsequently described. An electrical motor 128 has a shaft 130 provided with a drive roller 132. The roller 132 is connected by a drive belt 134 to a drive roller, not shown, which is mounted on shaft 136. The shaft 136 is mounted in a pair of transversely spaced roller bearings, not shown. A drive link 138 is operatively connected to the shaft 136. The outer end of the link 138 is connected to a generally U-shaped bracket 140 which is in turn connected to the slide 124. When the motor 128 is energized it drives the belt 134 which in turn rotates the shaft 136. As a result thereof the link 138, bracket 140 and slide 124 are reciprocated back and forth in the directions of arrow A, shown in FIGS. 15 and 16. The amount of reciprocation of the slide 124 is very small and is measured in thousandths of an inch. The vibrating machine 102 also includes a container 141 (FIG. 19) which is not shown in FIGS. 15 and 16 for clarity purposes and which is used for a purpose to be subsequently described.

The male die member or punch 78, which serves as a master member, is polished by hand with a fine emery cloth, etc. to provide a high-quality finish thereon. Prior to mounting the punch 78 (or master member) on the mounting plate 112 it is necessary to attach to the matching surface of the punch 78 a cover 144 made from a plastic material, soft metal or the like, as shown in FIG. 20, and which is adapted to carry or hold abrasive material. The cover 144 has a thickness less than the thickness of the material to be stamped or formed. Assuming that the die members are to be utilized in stamping a sheet of stainless steel having a thickness of 0.024 inch, it is first necessary to subtract from such thickness the thickness of the abrasive grain or material which is used to mechanically alter the female die 100 as will subsequently appear. Assuming that the abrasive grain or material has a thickness of 0.0041 inch, subtract same from the thickness of the stainless steel, that is, 0.024 inch leaving a difference of 0.0199 inch, which represents the thickness of the plastic or metal cover 144 to be placed upon the male die member or master member 78 as shown in FIGS. 19 and 20.

As shown in FIG. 21, an adhesive or resin 146 is initially placed on the matching surface of the punch or master member 78. Thereafter the cover 144, as an example made from a vinyl plastic material, is placed over the punch 78 and secured thereto by means of the adhesive or resin 146. Heat may be applied if necessary in order to firmly secure the cover 144 to the punch 78.

After the punch 78 has been prepared with the plastic cover 144 to form the master member, it is mounted on the plate 112 of the vibrating machine 102, while the female die member 100 is mounted on the slide 124. However, it should be appreciated that the female die member 100 could be mounted on the plate 112, with the male die member 78 mounted on the reciprocating slide 124.

The new method and technique further requires the use of a chemical solution which will react with the surface of the female die member 100 to be machined or matched to the master surface of the plastic cover punch 78 and soften or alter the protuberances on the die surface of the female die member 100 to a point where such surface can be easily abraded. It has been found that a chemical solution of copper sulfate produces good results. With the vibrating machine 102 in an open or nonoperating position as shown in FIG. 15, a solution of copper sulfate 150 is placed in the container 141 (FIG. 19). The female die member 100 is located in the container 141 as illustrated. The slide 110 is then lowered and the machine 102 is in the operating position shown in FIG. 16. The steel of the female die member 100 is more chemically active than the copper in the solution 150. The steel combines with the sulfate ion to form iron sulfate in solution. The copper ion, previously in solution, is deposited on the matching surface of the die member 100 as metallic copper. It is well known that copper is a soft metal and is easily scratched. Thus, as the copper is scratched away from the surface of the die member 100, as will be described hereinafter, more steel of the die member 100 is exposed to the chemical solution, which immediately forms more iron sulfates, etc., with additional copper deposited on the die member 100.

The slide 112 is then raised to the nonoperating position. An abrasive grain or grit material 154 is introduced in the solution 150 at the interface of the female die member 100 and the cover 144 of the punch 78 as best illustrated in FIG. 21. The cover 144 which can be made from any suitable formable material, permits the grain or grit material 154 to become embedded therein as will subsequently appear. As an example, silicone carbide or aluminum oxide, which is sold under the trademark Aludum by the Norton Company or other suitable abrasive material may be used. The toolmaker is now ready to begin the selective removal of any protuberances on the female die member 100. The copper sulfate solution 150 reacts immediately with the entire matching surface of the female die member 100. The depth of the chemical change is controlled by the strength and composition of the copper sulfate solution 150. It is desirable to restrict the depth of the chemical alteration of the matching surface of the female die member 100 to a few ten-thousandths of an inch.

Thereafter the plastic covered punch 78 is again lowered and brought into contact with the chemically altered female die member 100 as shown in FIGS. 16, 19 and 21. The cover 144 on the punch 78 picks up some of the abrasive material 154. The surfaces of the abrasive-embedded plastic-covered punch 78 and the die member 100 are then rubbed together by the reciprocation of slide 124. The vibration of the slide 124 relative to the punch 78 causes the abrasive material 154 to scratch the chemically altered surface of the female die member 100 at the points or areas of contact. Thus by alternately mechanically abrading and chemically altering the protuberances of the die member 100 it is possible to arrive at an extremely high-quality level of tool and die spotting or matching.

When stamping sheet metal according to present technology it is necessary to add springback and overbend to the finished punch or die. The die maker at such time incorporates the springback and overbend into the finished die by guesswork and skill, all of which requires much time and labor. In many instances, an extensive reworking of the die is required because of the difficulty of accurately and swiftly checking the amount of springback and overbend placed in the punch or die by the die maker. As is known in the art, the die maker uses the original wood model for checking purposes when incorporating the springback and overbend into the finish die. In certain cases the die maker must rework the die many times.

In order to overcome the aforementioned difficulties and problems in the art, the present invention uses the metal expansion model 38 of FIG. 4 and incorporates in said model 38 the required amount of springback in the critical areas thereof. After the metal expansion model 38 is finished, it is then possible to place the overbend therein by simply bending the model 38 the required amount. Thereafter the model 38, with the springback and overbend incorporated therein, is placed adjacent the wood model 10 and an immediate comparison or check is made to verify the springback and overbend in the metal expansion model 38. The overbend of the model 38 is checked with base 16 of FIG. 1.

The drawings and the foregoing specification constitutes a description of the improved method for casting and finishing tools or dies in such full, clear, concise and exact terms as to enable any person skilled in the art to practice the invention, the scope of which is indicated by the appended claims.

What I claim as my invention is:

1. The method of matching male and female die members which have predeterminedly but imperfectly matched corresponding forming surfaces due to protuberances on the latter, and are used in nested relationship of said members in the die forming of three-dimensionally contoured objects, comprising the steps of placing a conforming cover made from a relatively yieldable material on a forming surface of the male die member, immersing a corresponding forming surface of the female die member in a chemical solution which will chemically alter and soften said corresponding surface, and working the latter, in a nested relationship of said members, in a moving, protuberance removing action between said female die corresponding surface and a surface of said conforming cover, this action being limited in depth, in relation to said softened surface, only to remove any protuberances from said surface.

2. The method of matching male and female die members comprising the step of placing a conforming cover made from a relatively yieldable material on a forming surface of the male die member, immersing a matching surface of the female die member in a chemical solution which will chemically alter and soften said matching surface, and working the latter in a moving, protuberance removing action between said matching surface and a surface of said conforming cover, this action being limited in depth, in relation to said softened surface, only to remove any protuberances from said surface the chemical solution being copper sulfate.

3. The method of matching male and female die members comprising the step of placing a conforming cover made from relatively yieldable material on a forming surface of the male die member, immersing a matching surface of the female die member in a chemical solution which will chemically alter and soften said matching surface, and working the latter in a moving, protuberance removing action between said matching surface and a surface of said conforming cover, this action being limited in depth, in relation to said softened surface, only to remove any protuberances from said surface, abrasive material being interposed between said matching surface of surface of the female die member and the covered male die member for mechanically abrading protuberances on the said female die member.

4. The method of matching male and female die members defined in claim 3 wherein relative sliding motion is provided between said members to assist the abrasive material in the selective removal of the protuberances on the female die member.

5. The method of matching male and female die members defined in claim 4 wherein the female die member is reciprocated longitudinally thereof with respect to said male die member.

6. A method of matching male and female die members having corresponding substantially but imperfectly matching surfaces to be used in nested and mated relation to one another in the forming of three-dimensionally curvilinearly contoured objects, comprising covering a matching surface of one of said die members with a chemical solution which will chemically alter and soften said surface, interposing an abrasive material between said matching surface and a corresponding matching surface of the other die member, and providing relative movement between the male and female die members to assist said abrasive material in the selective reduction of said softened surface by a depth only sufficient to embrace and reduce any protuberances on said surface of said one die member representing an imperfect matching of the surfaces.

7. The method as defined in claim 6, in which it is the surface of the female die member that is softened, a conforming cover being applied over the matching surface of the male die member between said matching surface of the latter and said abrasive material.